United States Patent
Gardner et al.

(10) Patent No.: US 8,397,087 B1
(45) Date of Patent: Mar. 12, 2013

(54) SYSTEMS AND METHODS FOR INDIVIDUALLY MANAGING THE POWER USAGE OF SOFTWARE APPLICATIONS

(75) Inventors: Patrick Gardner, El Segundo, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 285 days.

(21) Appl. No.: 12/790,939

(22) Filed: May 31, 2010

(51) Int. Cl.
*G06K 9/00* (2006.01)

(52) U.S. Cl. ........ 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | | |
|---|---|---|---|---|
| 7,853,812 | B2* | 12/2010 | McBrearty et al. | 713/320 |
| 8,135,167 | B2* | 3/2012 | Lin | 382/100 |
| 2007/0283176 | A1* | 12/2007 | Tobias et al. | 713/322 |
| 2008/0189562 | A1* | 8/2008 | McBrearty et al. | 713/300 |
| 2009/0092293 | A1* | 4/2009 | Lin | 382/118 |

OTHER PUBLICATIONS

Aman Kansal et al., Fine-Grained Energy Profiling for Power-Aware Application Design, http://research.microsoft.com/en-us/um/people/zhao/pubs/hotmetrics08joulemeter.pdf, as accessed on Apr. 1, 2010.

Nathan Harrington, Reduce your PC's power consumption through smart activity monitors, http://www.ibm.com/developerworks/opensource/library/os-smart-monitors/index.html, as accessed on Apr. 1, 2010.

FARONICS; Take the Anti-Executable Challenge and Win; http://www.faronics.com/html/choose.asp, as accessed on Apr. 8, 2010.

* cited by examiner

*Primary Examiner* — M Elamin
(74) *Attorney, Agent, or Firm* — Advantedge Law Group

(57) ABSTRACT

A computer-implemented method for individually managing the power usage of software applications may include: 1) identifying at least one software application installed on a computing device, 2) determining the power usage of the software application, 3) identifying a power-management policy for managing the power usage of the software application independent of the overall power usage of the computing device, and then 4) managing the power usage of the software application independent of the overall power usage of the computing device in accordance with the power-management policy. Various other methods, systems, and computer-readable media are also disclosed.

17 Claims, 5 Drawing Sheets

SYSTEMS AND METHODS FOR INDIVIDUALLY MANAGING THE POWER USAGE OF SOFTWARE APPLICATIONS

BACKGROUND

Conventional power-management schemes typically manage the power usage of a computing device by determining whether, and to what extent, a user is currently using the computing device. For example, during periods of inactivity, a power-management scheme may cause a computing device to reduce its power consumption. Conversely, when usage peaks, such schemes may increase the power consumption of the computing device to ensure maximum performance.

While conventional power-management schemes may help to reduce the power usage of a computing device, these schemes typically manage power usage at the device or operating-system level. That is, conventional power-management schemes typically treat the entire device (or all applications running under the device's operating system) as a single entity to be managed. Unfortunately, such schemes fail to distinguish between critical or non-critical applications running on the device, unduly limiting the level of control a user may exercise when managing the power usage of his/her device.

In addition, while a software developer may vary the design and/or implementation of a software application in an attempt to optimize the power usage of the same, such an approach requires customizing each individual software application that is to be managed; a potentially time-consuming and expensive undertaking. As such, the instant disclosure identifies a need for systems and methods for enabling a user to quickly and easily individually manage the power usage of each application installed on the user's device.

SUMMARY

As will be described in greater detail below, the instant disclosure generally relates to systems and methods for individually managing the power usage of software applications. In one example, the systems described herein may accomplish such a task by: 1) identifying at least one software application installed on the computing device (by, e.g., identifying and grouping all software components that are associated with a software application into a single entity to be managed), 2) measuring or otherwise determining the power usage of the software application, 3) accessing a power-management policy that contains criteria for individually managing the power usage of the software application independent of the overall power usage of the computing device, and then 4) individually managing the power usage of the software application in accordance with the power-management policy.

In some examples, the systems described herein may measure or otherwise determine the power usage of a software application by: 1) measuring or otherwise identifying the computing resources that are used by the software application and then 2) determining, by correlating the computing resources used by the software application with the overall power usage of the computing device, the power usage of the software application (represented, for example, as a percentage or other measurement, such as kWh). For example, if the systems described determine that a particular software application consumes 4.1% of the total computing resources of a computing device, then these systems may attribute 4.1% of the overall power usage of the computing device to the software application in question.

In some examples, the systems described herein may enable a user to define the power-management policy by: 1) presenting (using, e.g., a GUI) the power usage of each software application installed on the computing device to the user (sorted, e.g., based on observed power usage), 2) presenting at least one option for managing the power usage of each software application to the user, 3) identifying at least one option selected by the user for managing the power usage of the software application, and then 4) creating the user-defined power-management policy based at least in part on the options selected by the user.

In one example, the systems described herein may display a slider for each installed application that enables a user to quickly and easily adjust the power usage of each application. In other examples, the systems described herein may provide a variety of additional settings and/or options for managing the power usage of each installed application, including, for example, options for managing the power usage of a software application based on whether the software application is currently executing in the background or foreground (e.g., the user may specify that the power usage of a software application should be reduced when the application is executing in the background but should not be reduced when the application is executing in the foreground), whether the software application represents a critical application (e.g., a user may specify that the power usage of critical software applications, as defined by the user, should not be reduced), how frequently the software application executes (e.g., a user may specify that software applications that run constantly should be reduced but that the power usage of software applications that run on-demand should not), whether the software application is associated with a particular user account, whether the software application is associated with a particular application grouping (e.g., a user may specify that the power usage of IM clients installed on the user's machine should be reduced but that the power usage of email clients should not), functionality provided by the software application (e.g., a user may specify that the power usage of software applications that utilize CPU resources should be reduced but that the power usage of software applications that utilize network resources should not), or the like.

In some examples, the systems described herein may manage the power usage of a software application by managing the software application's usage of the computing device's computing resources. For example, the systems described herein may disable, restrict, and/or limit the software application's usage of the computing device's network resources (by, e.g., restricting and/or throttling the software application's network access), storage resources (by, e.g., buffering read and/or write operations generated by the software application in order to allow the device's storage device to spin down and/or power off for longer periods of time and/or by organizing specific files and/or data that are associated with the software application so they are located physically contiguously on the storage device in order to reduce disk spins and seek times), CPU resources (by, e.g., setting the CPU affinity for the software application to a single core), GPU resources (by, e.g., disabling GPU acceleration for the software application), and/or display-device resources (by, e.g., causing windows spawned by a particular software application to utilize darker-colored window schemes). These systems may also limit and/or reduce the frequency of interrupts generated by the software application (by, e.g., hooking timer-based tasks performed by the software application in order to reduce the frequency of the same).

In some embodiments, the systems described herein may manage a group of related software applications independent of the overall power usage of the computing device in accordance with a group-based power-management policy. For example, the systems described herein may significantly reduce the power usage of all software applications that run on a continual basis, but may only slightly reduce the power usage of "critical" (as defined, e.g., by a user) software applications.

As will be explained in detail below, the systems and methods described herein may enable users to individually manage the power usage of software applications on an application-by-application basis without requiring individual customization of the same. As such, these systems and methods may provide users with a greater degree of control over the power usage of their computing devices, potentially resulting in significant energy savings without sacrificing performance and/or functionality.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
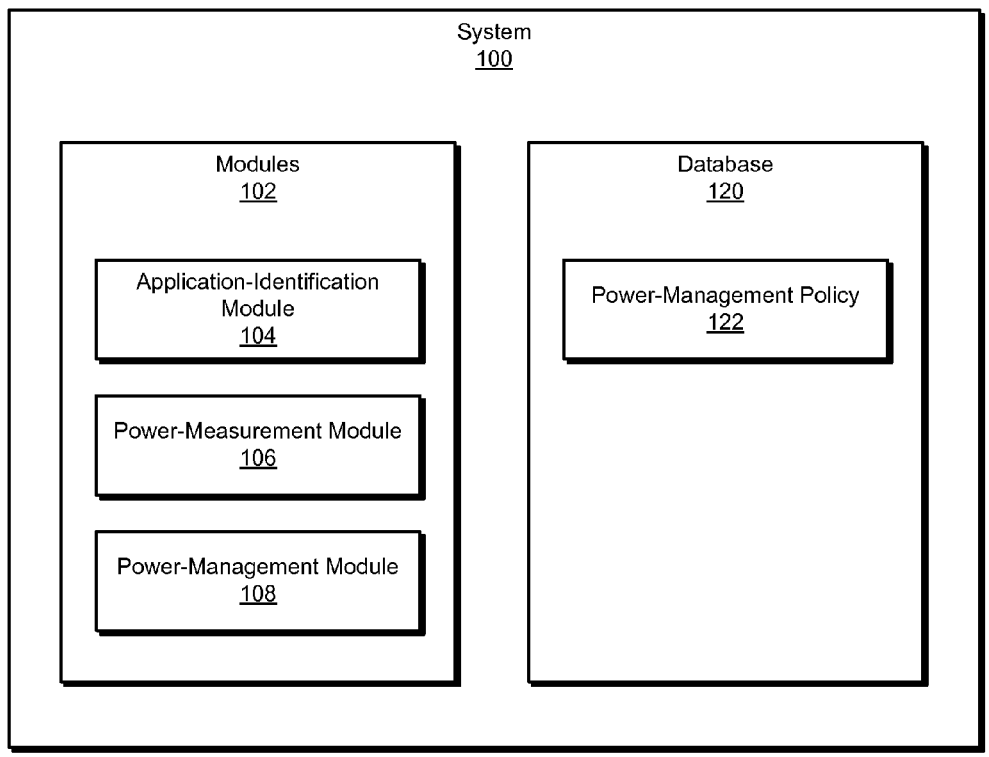
FIG. 1 is a block diagram of an exemplary system for individually managing the power usage of software applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
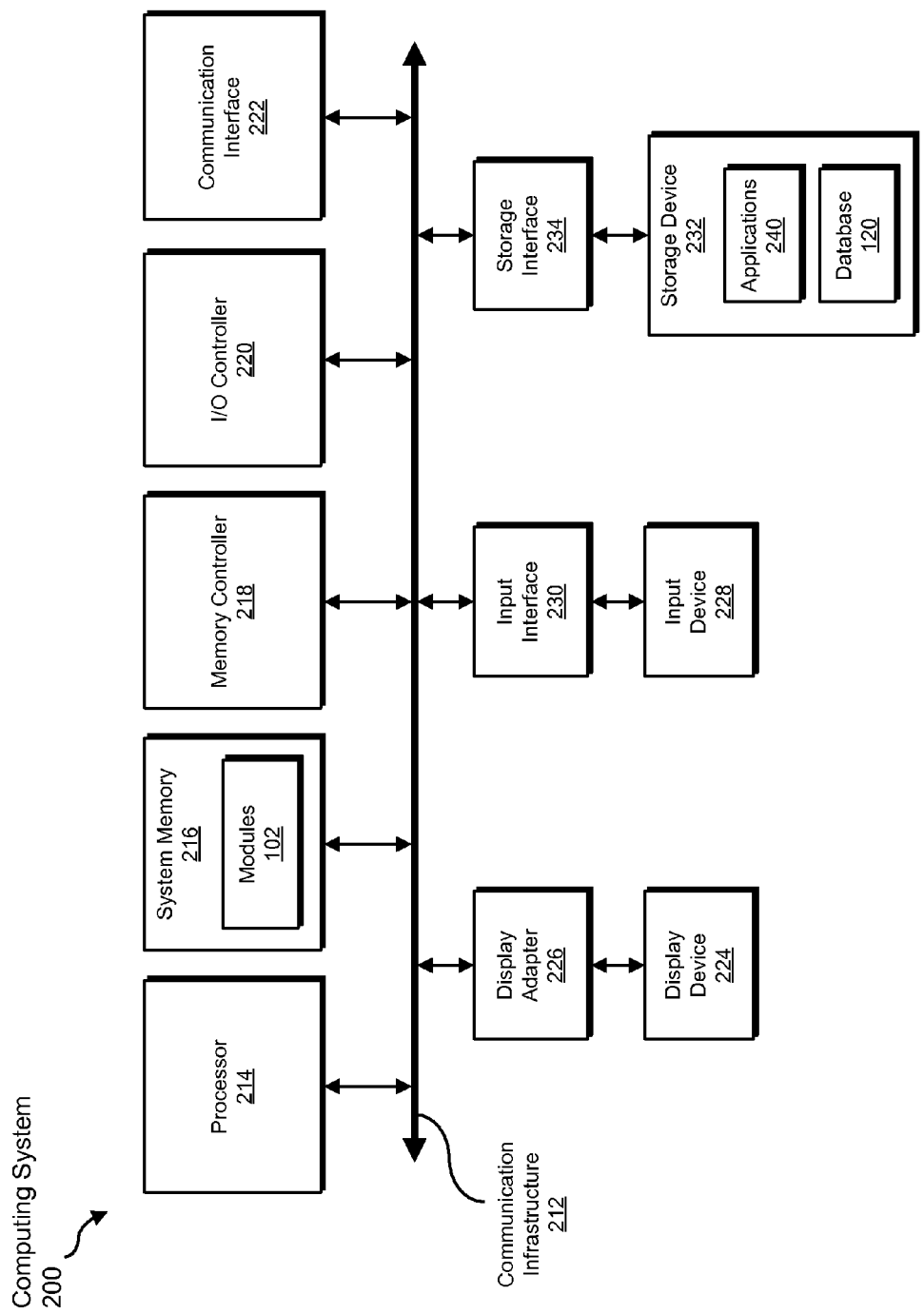
FIG. 2 is a block diagram of an exemplary computing system for individually managing the power usage of software applications.

The following will provide, with reference to FIGS. 1-2, detailed descriptions of exemplary systems for individually managing the power usage of software applications. Detailed descriptions of corresponding computer-implemented methods will also be provided in connection with FIG. 3. In addition, detailed descriptions of an exemplary network architecture capable of implementing one or more of the embodiments described herein will be provided in connection with FIG. 5.

FIG. 1 is a block diagram of an exemplary system 100 for individually managing the power usage of software applications. As illustrated in this figure, exemplary system 100 may include one or more modules 102 for performing one or more tasks. For example, and as will be explained in greater detail below, exemplary system 100 may include an application-identification module 104 programmed to identify a software application (by, e.g., identifying and grouping the various software components associated with the software application into a single entity to be managed). Exemplary system 100 may also include power-measurement module 106 programmed to measure or determine the individual power usage of the software application.

In addition, and as will be described in greater detail below, exemplary system 100 may include a power-management module 108 programmed to manage the power usage of the software application independent of the overall power usage of a computing device in accordance with a power-management policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 200 in FIG. 2 and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more power-management policies, such as power-management policy 122. As will be described in greater detail below, power-management policy 122 may be used-defined and/or system-defined.

Database 120 may represent portions of a single database or computing device or a plurality of databases or computing devices. For example, database 120 may represent a portion of computing system 200 in FIG. 2 and/or portions of exemplary network architecture 500 in FIG. 5. Alternatively, database 120 in FIG. 1 may represent one or more physically separate devices capable of being accessed by a computing device, such as computing system 200 in FIG. 2 and/or portions of exemplary network architecture 500 in FIG. 5.

Exemplary system 100 in FIG. 1 may be deployed in a variety of ways. For example, all or a portion of exemplary system 100 may represent portions of exemplary system 200 in FIG. 2. FIG. 2 is a block diagram of an exemplary computing system 200 capable of implementing one or more of the embodiments described and/or illustrated herein. Computing system 200 broadly represents any single or multi-processor computing device or system capable of executing computer-readable instructions. Examples of computing system 200 include, without limitation, workstations, laptops, client-side terminals, servers, distributed computing systems, handheld devices, or any other computing system or device. In its most basic configuration, computing system 200 may include at least one processor 214 and system memory 216.

Processor 214 generally represents any type or form of processing unit capable of processing data or interpreting and executing instructions. In certain embodiments, processor 214 may receive instructions from a software application or module. These instructions may cause processor 214 to perform the functions of one or more of the exemplary embodiments described and/or illustrated herein. For example, and as will be described in greater detail below in connection with FIG. 3, processor 214 may, upon executing modules 102: 1) identify at least one software application installed on computing system 200 (e.g., applications 240), 2) determine the power usage of the identified software application(s), 3) identify a power-management policy (e.g., power-management policy 122 within database 120) that contains criteria for managing the power usage of the software application(s) independent of the overall power usage of computing system 200, and then 4) manage the power usage of the software application(s) independent of the overall power usage of computing system 200 in accordance with the power-management policy.

System memory 216 generally represents any type or form of volatile or non-volatile storage device or medium capable of storing data and/or other computer-readable instructions. Examples of system memory 216 include, without limitation, random access memory (RAM), read only memory (ROM), flash memory, or any other suitable memory device. Although not required, in certain embodiments computing system 200 may include both a volatile memory unit (such as, for example, system memory 216) and a non-volatile storage device (such as, for example, storage device 232, as described in detail below). In one example, one or more of modules 102 may be loaded into system memory 216.

In certain embodiments, exemplary computing system 200 may also include one or more components or elements in addition to processor 214 and system memory 216. For example, and as illustrated in FIG. 2, computing system 200 may include a memory controller 218, an Input/Output (I/O) controller 220, and a communication interface 222, each of which may be interconnected via a communication infrastructure 212. Communication infrastructure 212 generally represents any type or form of infrastructure capable of facilitating communication between one or more components of a computing device. Examples of communication infrastructure 212 include, without limitation, a communication bus (such as an ISA, PCI, PCIe, or similar bus) and a network.

Memory controller 218 generally represents any type or form of device capable of handling memory or data or controlling communication between one or more components of computing system 200. For example, in certain embodiments memory controller 218 may control communication between processor 214, system memory 216, and I/O controller 220 via communication infrastructure 212.

I/O controller 220 generally represents any type or form of module capable of coordinating and/or controlling the input and output functions of a computing device. For example, in certain embodiments I/O controller 220 may control or facilitate transfer of data between one or more elements of computing system 200, such as processor 214, system memory 216, communication interface 222, display adapter 226, input interface 230, and storage interface 234.

Communication interface 222 broadly represents any type or form of communication device or adapter capable of facilitating communication between exemplary computing system 200 and one or more additional devices. For example, in certain embodiments communication interface 222 may facilitate communication between computing system 200 and a private or public network including additional computing systems. Examples of communication interface 222 include, without limitation, a wired network interface (such as a network interface card), a wireless network interface (such as a wireless network interface card), a modem, and any other suitable interface. In at least one embodiment, communication interface 222 may provide a direct connection to a remote server via a direct link to a network, such as the Internet. Communication interface 222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 222 may also represent a host adapter configured to facilitate communication between computing system 200 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 222 may also allow computing system 200 to engage in distributed or remote computing. For example, communication interface 222 may receive instructions from a remote device or send instructions to a remote device for execution.

As illustrated in FIG. 2, computing system 200 may also include at least one display device 224 coupled to communication infrastructure 212 via a display adapter 226. Display device 224 generally represents any type or form of device capable of visually displaying information forwarded by display adapter 226. Similarly, display adapter 226 generally represents any type or form of device configured to forward graphics, text, and other data from communication infrastructure 212 (or from a frame buffer) for display on display device 224.

As illustrated in FIG. 2, exemplary computing system 200 may also include at least one input device 228 coupled to communication infrastructure 212 via an input interface 230. Input device 228 generally represents any type or form of input device capable of providing input, either computer or human generated, to exemplary computing system 200. Examples of input device 228 include, without limitation, a keyboard, a pointing device, a speech recognition device, or any other input device.

As illustrated in FIG. 2, exemplary computing system 200 may also include a storage device 232 coupled to communication infrastructure 212 via a storage interface 234. Storage device 232 generally represents any type or form of storage device or medium capable of storing data and/or other computer-readable instructions. For example, storage device 232 may be a magnetic disk drive (e.g., a so-called hard drive), a solid state drive, a floppy disk drive, a magnetic tape drive, an optical disk drive, a flash drive, or the like. Storage interface 234 generally represents any type or form of interface or device for transferring data between storage device 232 and other components of computing system 200. In one example, database 120 may be stored in storage device 232.

In certain embodiments, storage device 232 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 232 may also include other similar structures or devices for allowing computer software, data, or other computer-readable instructions to be loaded into computing system 200. For example, storage device 232 may be configured to read and write software, data, or other computer-readable information. Storage device 232 may represent a portion of computing system 200 and/or a separate device accessed through other interface systems.

Many other devices or subsystems may be connected to computing system 200. Conversely, all of the components and devices illustrated in FIG. 2 need not be present to practice the embodiments described and/or illustrated herein. The devices and subsystems referenced above may also be interconnected in different ways from that shown in FIG. 2. Computing system 200 may also employ any number of software, firmware, and/or hardware configurations. For example, one or more of the exemplary embodiments disclosed herein (e.g., modules 102) may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

In the above example, the computer-readable medium containing the computer program may be loaded into computing system 200. All or a portion of the computer program stored on the computer-readable medium may then be stored in system memory 216 and/or various portions of storage device 232. Additionally or alternatively, one or more of the exemplary embodiments described and/or illustrated herein may be implemented in firmware and/or hardware. For example, computing system 200 may be configured as an application specific integrated circuit (ASIC) adapted to implement one or more of the exemplary embodiments disclosed herein.

Figure 3:
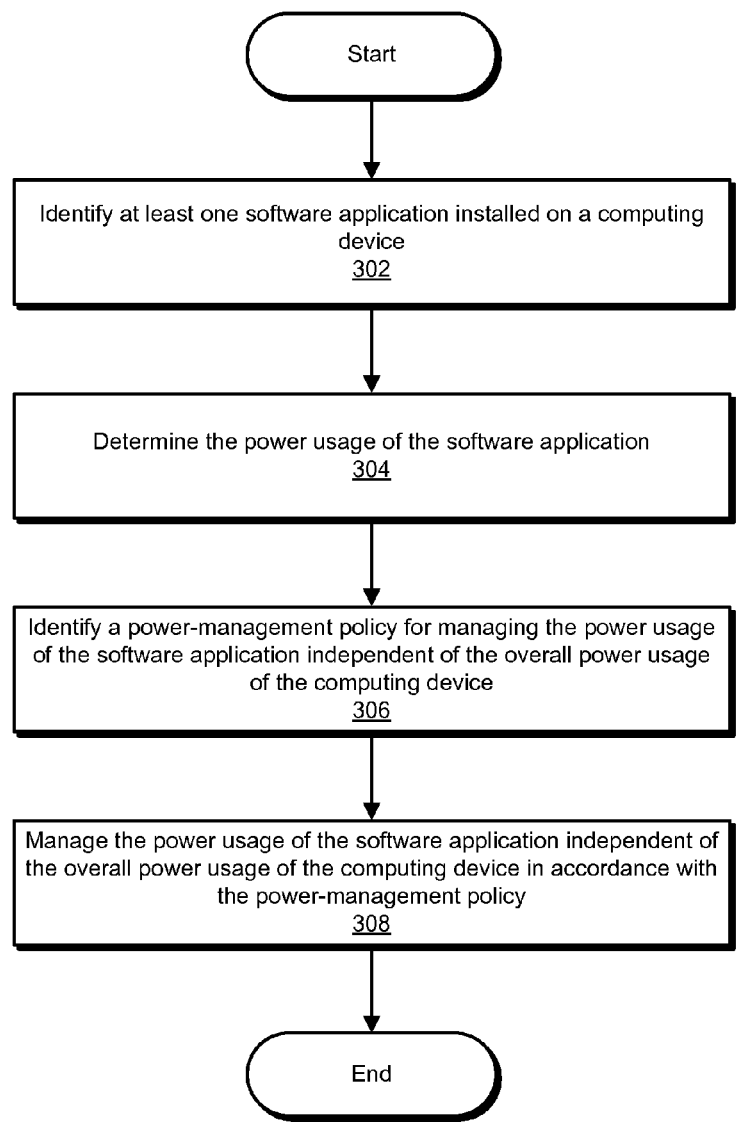
FIG. 3 is a flow diagram of an exemplary method for individually managing the power usage of software applications.

FIG. 3 is a flow diagram of an exemplary computer-implemented method 300 for individually managing the power usage of software applications. The steps shown in FIG. 3 may be performed by any suitable computer-executable code and/or computing system. In some embodiments, the steps shown in FIG. 3 may be performed by one or more of the components of system 100 in FIG. 1, computing system 200 in FIG. 2, and/or portions of exemplary network architecture 500 in FIG. 5.

As illustrated in this figure, at step 302 one or more of the systems described herein may identify at least one software application installed on a computing device. For example, application-identification module 104 in FIG. 1 may, as part of computing system 200 in FIG. 2, identify each software application (e.g., applications 240) installed on computing system 200.

The systems described herein may perform step 302 in a variety of ways. In one example, application-identification module 104 may identify a software application by identifying and then grouping all software components that are associated with the software application into a single entity to be managed. For example, application-identification module 104 may observe a software application during its installation process in order to identify each software component (e.g., files, plug-ins, shells, processes, services, or the like) created, launched, registered, or the like during installation of the software application. Application-identification module 104 may then group each of the identified software components into a single entity to be managed.

Returning to FIG. 3, at step 304 the systems described herein may determine the power usage of the software application identified in step 302. For example, power-measurement module 106 in FIG. 1 may, as part of computing system 200 in FIG. 2, determine or measure the individual power usage of each software application installed on computing system 200 (e.g., applications 240).

The systems described herein may perform step 304 in a variety of ways. In one example, application-measurement module 106 may determine the power usage of a software application by: 1) identifying computing resources that are used by the software application and then 2) determining, by correlating the computing resources used by the software application with the overall power usage of the computing device, the power usage of the software application. For example, power-measurement module 106 may determine, by measuring or otherwise identifying the percentage of computing resources of computing system 200 in FIG. 2 that are utilized by a particular software application, the percentage of the overall power usage of computing system 200 that may be attributable to the software application in question. For example, if power-measurement module 106 determines that a particular software application consumes 4.1% of the computing resources of computing system 200, then power-measurement module 106 may attribute 4.1% of the overall power usage of computing system 200 to the software application in question.

Power-measurement module 106 may measure or identify the computing resources used by a software application in a variety of ways. For example, power-measurement module 106 may identify the network resources used by the software application (e.g., the network bandwidth consumed by and/or the frequency with which the software application accesses network resources), the storage resources used by the software application (e.g., the number and/or frequency of disk reads and/or writes generated by the software application), the CPU resources used by the software application (e.g., the percentage and/or frequency of CPU usage generated by the software application and/or whether the software application utilizes single or multiple processing cores), the GPU resources used by the software application (e.g., the percentage of GPU resources utilized by the software application), the memory usage of the software application, the display-device resources used by the software application (e.g., whether the software application generates a display window and, if so, the size and/or color scheme utilized in such a window), or the like.

For example, power-measurement module 106 may determine that an IM client that generates constant network traffic, writes to storage often, has high memory usage, and uses a bright color scheme with rotating ads uses roughly 3.8% of the overall computing resources of computing system 200. In this example, power-measurement module 106 may attribute roughly 3.8% of the overall power usage of computing system 200 to the IM client in question.

Returning to FIG. 3, at step 306 the systems described herein may identify a power-management policy for managing the power usage of the software application independent of the overall power usage of the computing device. For example, power-management module 108 in FIG. 1 may, as part of computing system 200 in FIG. 2, access a power-management policy (such as power-management policy 122 in FIG. 1) that contains criteria for individually managing the power usage of the software application identified in step 302 independent of the overall power usage of computing system 200.

As detailed above, the power-management policy identified in step 306 may be user-defined and/or system-defined. In some examples, power-management module 108 may enable a user of computing system 200 to create a user-defined power-management policy by: 1) presenting the power usage of each software application installed on computing system 200 to a user, 2) presenting at least one option for managing the power usage of each application installed on computing system 200 to the user, 3) identifying at least one option selected by the user for managing the power usage of a software application, and then 4) creating a user-defined power-management policy based at least in part on the options selected by the user.

Figure 4:
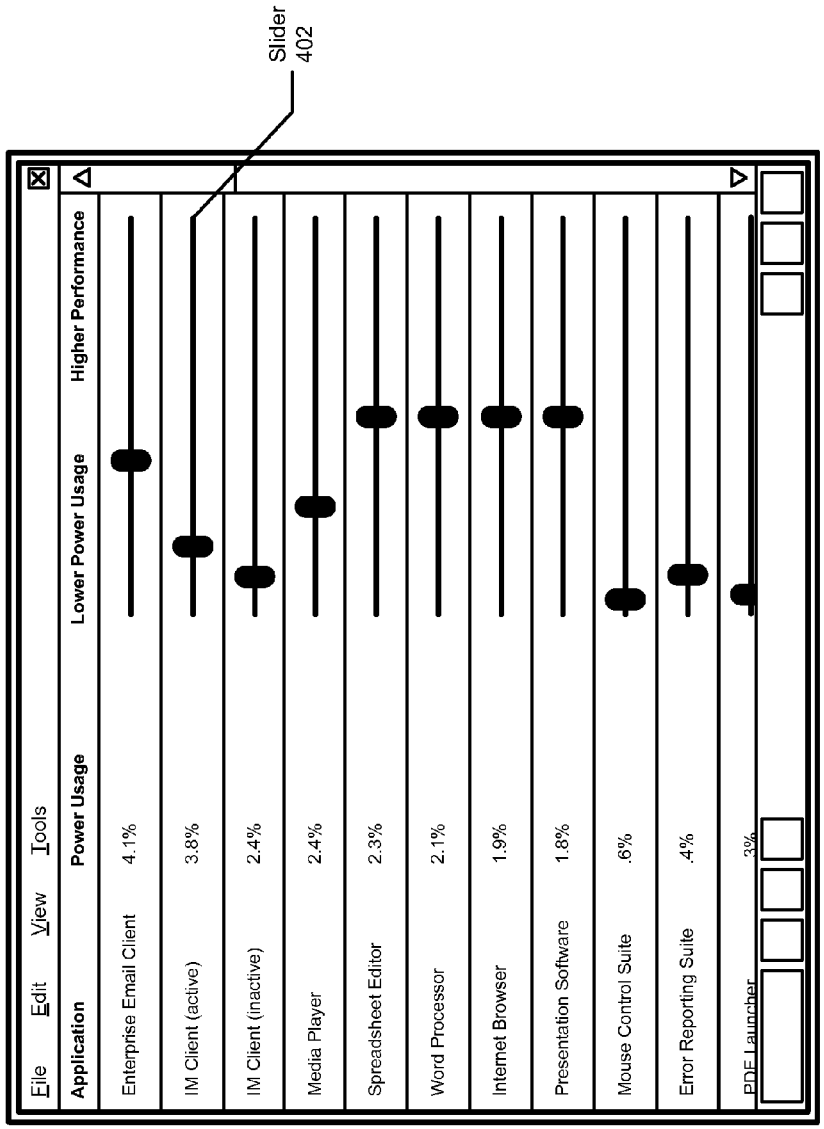
FIG. 4 is an illustration of an exemplary user interface for individually managing the power usage of software applications.

For example, and as illustrated in FIG. 4, power-management module 108 may generate a user interface 400 that presents or lists the power usage (represented, for example, as a percentage or other measurement, such as kWh) of each software application installed on computing system 200. In some examples, power-management module 108 may sort the applications displayed in user interface 400 based on, for example, overall power usage.

In one example, user interface 400 may include a single option for quickly and easily adjusting the power usage of each installed software application. For example, and as illustrated in FIG. 4, user interface 400 may include a slider 402 for each application that enables a user to quickly and easily adjust the power usage of each application. In this example, a user of computing system 200 may lower the power usage of a particular application (e.g., an IM client) by manipulating slider 402.

Although not illustrated in FIG. 4, power-management module 108 may also present a variety of additional options and/or settings for managing the power usage of the software applications installed on computing system 200. For example, power-management module 108 may generate a user interface that presents different options for managing the power usage of each software application installed on computing system 200 based on whether a software application is currently executing in the background or foreground (e.g., the user may specify that the power usage of a software application should be reduced when the application is executing in the background but should not be reduced when the application is executing in the foreground), whether the software application represents a critical application (e.g., a user may specify that the power usage of critical software applications, as defined by the user, should not be reduced), how frequently the software application executes (e.g., a user may specify that software applications that run constantly should be reduced but that the power usage of software applications that run on-demand should not), whether the software application is associated with a particular user account, whether the software application is associated with a particular application grouping (e.g., a user may specify that the power usage of IM clients installed on the user's machine should be reduced but that the power usage of email clients should not), functionality provided by the software application (e.g., a user may specify that the power usage of software applications that utilize CPU resources should be reduced but that the power usage of software applications that utilize network resources should not), or the like.

Upon identifying at least one option selected by the user for managing the power usage of a particular software application (e.g., upon determining that the user has manipulated slider 402 for at least one software application), power-management module 108 may create a user-defined power-management policy that is based at least in part on the option selected by the user. For example, if the user specifies (by, e.g., manipulating slider 402) that the power usage of an IM client should be reduced by 25% when the IM client is active (i.e., operating in the foreground) and by 50% when the IM client is inactive (i.e., operating in the background), then power-management module 108 may create a user-defined power-management policy that specifies reducing the power usage of the IM client by 25% when the IM client is operating in the foreground and by 50% when the IM client is operating in the background. In some examples, the systems described herein may determine whether a software application is running in the foreground or background by monitoring window events and/or various system APIs.

Returning to FIG. 3, at step 308 the systems described herein may manage the power usage of the software application independent of the overall power usage of the computing device in accordance with the power-management policy. For example, power-management module 108 in FIG. 1 may, as part of computing system 200 in FIG. 2, individually manage the power usage of one or more of the software applications presented in user interface 400 in FIG. 4 in accordance with the power-management policy identified in step 306. Upon completion of step 308 in FIG. 3, exemplary method 300 may terminate.

The systems described herein may manage the power usage of a software application independent of the overall power usage of a computing device on which the application is installed in a variety of ways. In one example, the systems described herein may manage the power usage of a software application by managing the software application's usage of a device's network resources, storage resources, CPU resources, GPU resources, display-device resources and/or the like.

For example, power-management module 108 may disable, restrict, and/or limit (by, e.g., throttling) the network access of a particular software application. Similarly, power-management module 108 may buffer or defer read/write operations generated by a particular software application (by, e.g., redirecting I/O generated by the software application to an in-memory buffer) in order to allow a storage device to spin down and/or power off for longer periods of time. Similarly, power-management module 108 may organize specific files and data that are associated with a particular software application so they are located physically contiguously on a storage device in order to reduce disk spins and seek times.

In another example, power-management module 108 may set the CPU affinity of a particular software application to a single core (or select cores) when only a single processor or (or select processors) is required or when processing is not time-critical, thus enabling the device to power down unused cores. Power-management module 108 may also disable GPU acceleration for a particular software application in order to reduce the power consumed by a device's GPU.

In another example, power-management module 108 may control the window brightness and/or color selection or scheme of a display device when a particular software application is executing. For example, because many display devices consume less power when displaying darker-colored pixels (as opposed to lighter-colored pixels), in some examples power-management module 108 may cause windows spawned by a particular software application to utilize darker-colored window schemes in order to reduce the amount of power consumed by a device's display device.

Power-management module 108 may also manage a particular software application's usage of computing resources by managing or limiting the frequency of interrupts generated by the software application. For example, power-management module 108 may hook timer-based tasks performed by a particular software application in order to reduce the frequency of these timer-based tasks, thus reducing the application's usage of a device's computing resources.

In some examples, the systems described herein may manage a group of related software applications independent of the overall power usage of the computing device in accordance with a group-based power-management policy. For example, a user (by, e.g., interacting with user interface 400 in FIG. 4) or a system may group related software applications into groupings based on various shared characteristics. For example, a user or a system may group software applications based on whether the software applications represent critical applications, based on how frequently the software applications execute (e.g., on-demand versus continuous), based on whether the software applications are associated with a particular user account, and/or based on functionality provided by the software applications. In these examples, power-management module 108 may manage the power usage of such grouped software applications at the group level. For example, power-management module 108 may drastically reduce the power usage of all software applications that run on a continual basis, but may only slightly reduce the power usage of "critical" (as defined, e.g., by a user) software applications.

As explained above, the systems and methods described herein may enable users to individually manage the power usage of software applications on an application-by-application basis without requiring individual customization of the same. As such, these systems and methods may provide users with a greater degree of control over the power usage of their computing devices, potentially resulting in significant energy savings without sacrificing performance and/or functionality.

Figure 5:
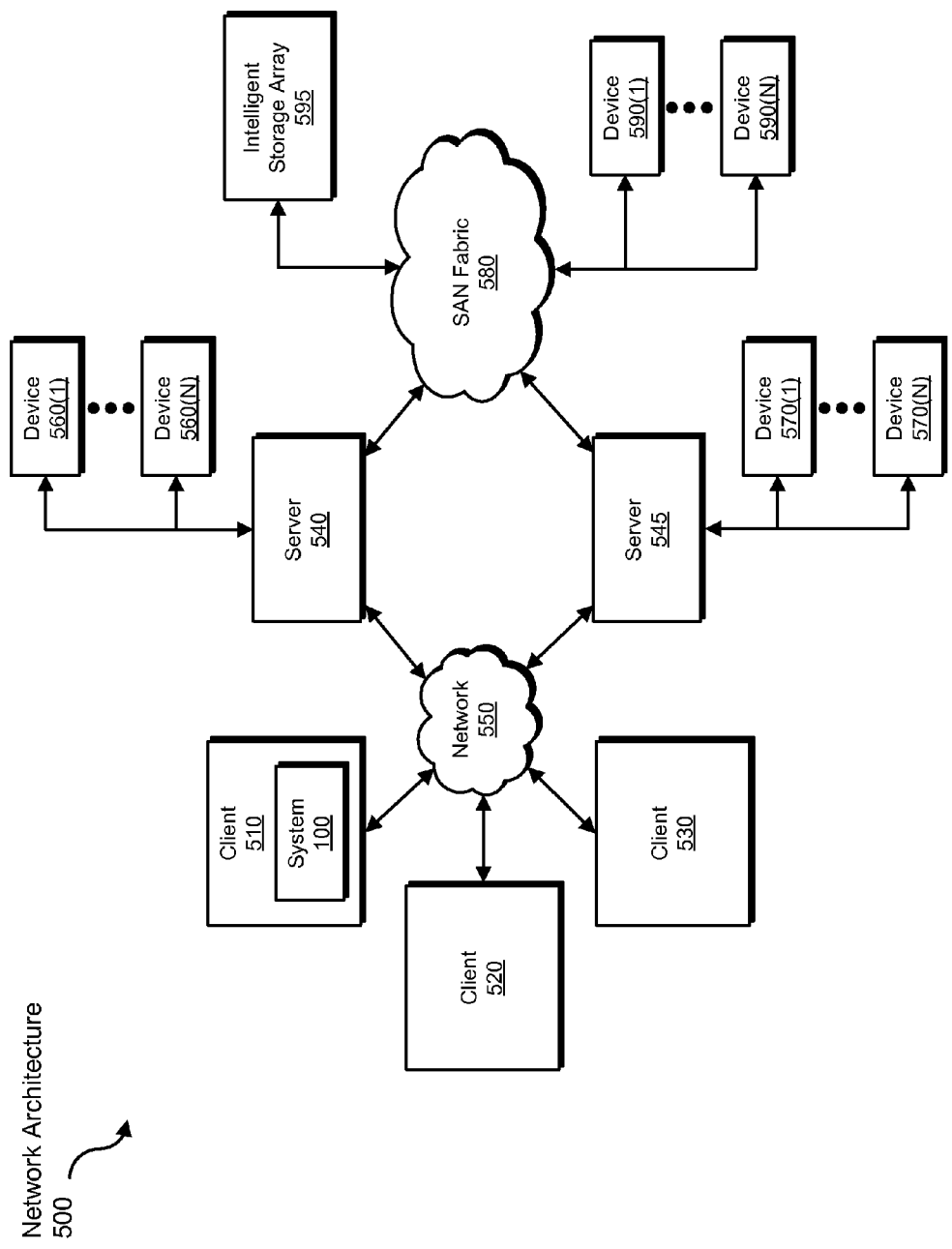
FIG. 5 is a block diagram of an exemplary computing network capable of implementing one or more of the embodiments described and/or illustrated herein.

As detailed above, exemplary system 100 in FIG. 1 may be deployed in a variety of ways. For example, all or a portion of exemplary system 100 may be deployed within the exemplary network architecture illustrated in FIG. 5. FIG. 5 is a block diagram of an exemplary network architecture 500 in which client systems 510, 520, and 530 and servers 540 and 545 may be coupled to a network 550. In one example, client systems 510, 520, and/or 530 and/or servers 540 and/or 545 may include system 100 from FIG. 1.

Client systems 510, 520, and 530 generally represent any type or form of computing device or system, such as exemplary computing system 200 in FIG. 2. Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 200 of FIG. 2, a communication interface, such as communication interface 222 in FIG. 2, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the exemplary embodiments disclosed herein.

As detailed above, computing system 200 and/or one or more components of network architecture 500 may perform and/or be a means for performing, either alone or in combination with other elements, one or more steps of an exemplary method for individually managing the power usage of software applications. In one example, such a method may include: 1) identifying at least one software application installed on the computing device, 2) determining the power usage of the software application, 3) identifying a power-management policy for managing the power usage of the software application independent of the overall power usage of the computing device, and then 4) managing the power usage of the software application independent of the overall power usage of the computing device in accordance with the power-management policy.

In some examples, identifying the software application may include identifying all software components that are associated with the software application. In addition, determining the power usage of the software application may include: 1) identifying computing resources used by the software application and then 2) determining, by correlating the computing resources used by the software application with the overall power usage of the computing device, the power usage of the software application. Examples of the types of computing resources that the software application may use include, without limitation, network resources, storage resources, CPU resources, GPU resources, memory resources, and display-device resources.

In some examples, identifying the power-management policy may include identifying a user-defined and/or a system-defined power-management policy. In these examples, identifying the user-defined power-management policy may include: 1) presenting the power usage of the software application to a user, 2) presenting at least one option for managing the power usage of the software application to the user, 3) identifying at least one option selected by the user for managing the power usage of the software application, and then 4) creating the user-defined power-management policy based at least in part on the option selected by the user.

In one example, presenting the power usage of the software application to the user may include presenting the power usage of each software application installed on the computing device in a list that is sorted based on power usage. In another example, presenting at least one option for managing the power usage of the software application may include presenting differing options for managing the power usage of the software application based on whether the software application is currently executing in the background or foreground, whether the software application represents a critical application, how frequently the software application executes, whether the software application is associated with a particular user account, whether the software application is associated with a particular application grouping, and/or functionality provided by the software application.

In some examples, managing the power usage of the software application may include managing the software application's usage of computing resources of the computing device. In this example, managing the software application's usage of the computing resources of the computing device may include managing the software application's usage of the computing device's network resources, managing the software application's usage of the computing device's storage resources, managing the software application's usage of the computing device's CPU resources, managing the software application's usage of the computing device's GPU resources, managing the software application's usage of the computing device's display-device resources, and/or managing the frequency of interrupts generated by the software application.

Managing the power usage of the software application independent of the overall power usage of the computing device in accordance with the power-management policy may also include managing a group of related software applications independent of the overall power usage of the computing device in accordance with a group-based power-management policy.

While the foregoing disclosure sets forth various embodiments using specific block diagrams, flowcharts, and examples, each block diagram component, flowchart step, operation, and/or component described and/or illustrated herein may be implemented, and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 from FIG. 1 may transform the power-usage characteristics or properties of a computing system (such as computing system 200 in FIG. 2) by individually managing the power usage of each software application installed on the computing system in accordance with a power-management policy.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for individually managing the power usage of software applications, at least a portion of the method being performed by a computing device comprising at least one processor, the method comprising:
   identifying at least one software application installed on the computing device;
   determining the power usage of the software application;
   presenting the power usage of the software application to a user;
   presenting at least one option for managing the power usage of the software application to the user;
   identifying at least one option selected by the user for managing the power usage of the software application;

creating a user-defined power-management policy based at least in part on the option selected by the user;
managing the power usage of the software application independent of the overall power usage of the computing device in accordance with the user-defined power-management policy.

2. The method of claim 1, wherein identifying the software application comprises identifying all software components that are associated with the software application.

3. The method of claim 1, wherein determining the power usage of the software application comprises:
identifying computing resources used by the software application;
determining, by correlating the computing resources used by the software application with the overall power usage of the computing device, the power usage of the software application.

4. The method of claim 3, wherein identifying the computing resources used by the software application comprises identifying at least one of:
network resources used by the software application;
storage resources used by the software application;
CPU resources used by the software application;
GPU resources used by the software application;
memory resources used by the software application;
display-device resources used by the software application.

5. The method of claim 1, wherein presenting the power usage of the software application to the user comprises presenting the power usage of each software application installed on the computing device in a list that is sorted based on power usage.

6. The method of claim 1, wherein presenting the option for managing the power usage of the software application comprises presenting differing options for managing the power usage of the software application based on:
whether the software application is currently executing in the background or foreground;
whether the software application represents a critical application;
how frequently the software application executes;
whether the software application is associated with a particular user account;
whether the software application is associated with a particular application grouping;
functionality provided by the software application.

7. The method of claim 1, wherein managing the power usage of the software application comprises managing the software application's usage of computing resources of the computing device.

8. The method of claim 7, wherein managing the software application's usage of the computing resources of the computing device comprises at least one of:
managing the software application's usage of the computing device's network resources;
managing the software application's usage of the computing device's storage resources;
managing the software application's usage of the computing device's CPU resources;
managing the software application's usage of the computing device's GPU resources;
managing the software application's usage of the computing device's display-device resources;
managing the frequency of interrupts generated by the software application.

9. The method of claim 1, wherein managing the power usage of the software application independent of the overall power usage of the computing device in accordance with the user-defined power-management policy comprises managing a group of related software applications independent of the overall power usage of the computing device in accordance with a group-based power-management policy.

10. A system for individually managing the power usage of software applications, the system comprising:
an application-identification module programmed to identify at least one software application installed on a computing device;
a power-measurement module programmed to determine the power usage of the software application;
a power-management module programmed to:
present the power usage of the software application to a user;
present at least one option for managing the power usage of the software application to the user;
identify at least one option selected by the user for managing the power usage of the software application;
create a user-defined power-management policy based at least in part on the option selected by the user;
manage the power usage of the software application independent of the overall power usage of the computing device in accordance with the user-defined power-management policy;
at least one processor configured to execute the application-identification module, the power-measurement module, and the power-management module.

11. The system of claim 10, wherein the application-identification module identifies the software application by identifying all software components that are associated with the software application.

12. The system of claim 10, wherein the power-measurement module determines the power usage of the software application by:
identifying computing resources used by the software application;
determining, by correlating the computing resources used by the software application with the overall power usage of the computing device, the power usage of the software application.

13. The system of claim 10, wherein the power-management module presents the power usage of the software application to the user by presenting the power usage of each software application installed on the computing device in a list that is sorted based on power usage.

14. The system of claim 10, wherein the power-management module presents the option for managing the power usage of the software application by presenting differing options for managing the power usage of the software application based on:
whether the software application is currently executing in the background or foreground;
whether the software application represents a critical application;
how frequently the software application executes;
whether the software application is associated with a particular user account;
whether the software application is associated with a particular application grouping;
functionality provided by the software application.

15. The system of claim 10, wherein the power-management module manages the power usage of the software application by managing the software application's usage of computing resources of the computing device.

16. The system of claim 10, wherein the power-management module manages the power usage of the software application independent of the overall power usage of the computing device in accordance with the user-defined power-management policy by managing a group of related software applications independent of the overall power usage of the computing device in accordance with a group-based power-management policy.

17. A non-transitory computer-readable-storage medium comprising one or more computer-executable instructions that, when executed by at least one processor of a computing device, cause the computing device to:

identify at least one software application installed on the computing device;

determine the power usage of the software application;

present the power usage of the software application to a user;

present at least one option for managing the power usage of the software application to the user;

identify at least one option selected by the user for managing the power usage of the software application;

create a user-defined power-management policy based at least in part on the option selected by the user;

manage the power usage of the software application independent of the overall power usage of the computing device in accordance with the user-defined power-management policy.

* * * * *